US012489221B2

(12) United States Patent
Johnson

(10) Patent No.: US 12,489,221 B2
(45) Date of Patent: Dec. 2, 2025

(54) SIZE EXPANDABLE DUAL POLARIZED ANTENNA ARRAY

(71) Applicant: BAE SYSTEMS Information and Electronic Systems Integration Inc., Nashua, NH (US)

(72) Inventor: Alexander D. Johnson, Waltham, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 200 days.

(21) Appl. No.: 18/456,187

(22) Filed: Aug. 25, 2023

(65) Prior Publication Data

US 2025/0070478 A1 Feb. 27, 2025

(51) Int. Cl.

*H01Q 21/06* (2006.01)
*H01Q 1/08* (2006.01)
*H01Q 21/24* (2006.01)

(52) U.S. Cl.

CPC ............. *H01Q 21/062* (2013.01); *H01Q 1/08* (2013.01); *H01Q 21/24* (2013.01)

(58) Field of Classification Search

CPC ........ H01Q 21/062; H01Q 1/08; H01Q 21/24; H01Q 1/28

See application file for complete search history.

(56) References Cited

U.S. PATENT DOCUMENTS 7,042,412 B2 5/2006 Chuang
9,077,071 B2 7/2015 Shtrom et al.
(Continued)

FOREIGN PATENT DOCUMENTS

EP 2779307 A1 9/2014
GB 2510144 A1 7/2014
(Continued)

OTHER PUBLICATIONS

Zhong, Jingni, et al. "Dual-Linear Polarized Phased Array with 9:1 Bandwidth and 60° Scanning off Broadside." IEEE Transactions on Antennas and Propagation, vol. 67, No. 3, 2019, pp. 1996-2001, https://doi.org/10.1109/tap.2019.2891607.
(Continued)

*Primary Examiner* — Hai V Tran
(74) *Attorney, Agent, or Firm* — Gary McFaline

(57) ABSTRACT

Techniques are provided for fabricating an expandable tightly coupled dipole array (TCDA) antenna with dual-linear linear polarization. An antenna implementing the techniques according to an embodiment includes an array of the electrically coupled antenna elements. The antenna elements comprise a horizontally polarized planar dipole antenna disposed on a first foldable substrate and a ground plane disposed on a second foldable substrate. The second substrate is parallel to the first substrate. The antenna elements also comprise a first printed circuit board (PCB) coupling the first substrate to the second substrate, the first PCB perpendicular to the first substrate and the second substrate, and a second PCB coupling the first substrate to the second substrate, the second PCB perpendicular to the first substrate and the second substrate and parallel to the first PCB. The antenna elements further comprise a vertically polarized dipole antenna disposed on the second PCB.

20 Claims, 9 Drawing Sheets

(56) References Cited

U.S. PATENT DOCUMENTS

| | | | | |
|---|---|---|---|---|
| 9,225,058 | B2 | 12/2015 | Devries et al. | |
| 9,843,108 | B2 | 12/2017 | Le et al. | |
| 10,181,655 | B2 | 1/2019 | Shtrom et al. | |
| 10,530,068 | B2 | 1/2020 | Mirmozafari et al. | |
| 10,819,042 | B2 | 10/2020 | Xia et al. | |
| 10,938,109 | B2 | 3/2021 | Georgakopoulos et al. | |
| 11,145,984 | B2 | 10/2021 | Murphy | |
| 2011/0175782 | A1 | 7/2011 | Choi et al. | |
| 2015/0162660 | A1 * | 6/2015 | Orsi | H01Q 9/42 343/866 |
| 2016/0226156 | A1 | 8/2016 | So et al. | |
| 2017/0062940 | A1 * | 3/2017 | Cao | H01Q 1/246 |
| 2018/0358706 | A1 * | 12/2018 | Kildal | H01Q 1/48 |
| 2019/0140364 | A1 * | 5/2019 | Mirmozafari | H01Q 1/246 |
| 2020/0212585 | A1 * | 7/2020 | Chayat | H01Q 5/378 |
| 2021/0344122 | A1 | 11/2021 | Kaistha et al. | |
| 2021/0359413 | A1 | 11/2021 | Sarabandi et al. | |
| 2021/0359419 | A1 * | 11/2021 | Chayat | H01Q 9/30 |
| 2022/0239009 | A1 | 7/2022 | Zhou et al. | |
| 2022/0271438 | A1 * | 8/2022 | Livadaru | H01Q 21/24 |

FOREIGN PATENT DOCUMENTS

| | | | |
|---|---|---|---|
| WO | WO2001054229 | A1 | 7/2001 |
| WO | WO2015166296 | A1 | 11/2015 |
| WO | WO2016011977 | A1 | 1/2016 |

OTHER PUBLICATIONS

Islam, Md Rakibul, et al. "Packable and Readily Deployable Tightly Coupled Dipole Array (TCDA) with Integrated Planar Balun." IEEE Open Journal of Antennas and Propagation, Institute of Electrical and Electronics Engineers (IEEE), Oct. 2022, pp. 1206-1217, https://doi.org/10.1109/ojap.2022.3214301.

Venkatakrishnan, Satheesh Bojja, et al. "Dynamically Reconfigurable and Packable Multifunctional Origami Antennas and Arrays," 2020 International Workshop on Antenna Technology (iWAT), Bucharest, Romania, 2020, pp. 1-2, doi: 10.1109/iWAT48004.2020.1570598881.

Novak, Markus H., et al. "Ultrawideband Antennas for Multiband Satellite Communications at UHF-Ku Frequencies." IEEE Transactions on Antennas and Propagation, vol. 63, No. 4, pp. 1334-1341, https://doi.org/10.1109/TAP.2015.2390616.

M. Carvalho and J. L. Volakis, "Deployable Rigid-Flexible Tightly Coupled Dipole Array (RF-TCDA)," in IEEE Open Journal of Antennas and Propagation, vol. 2, pp. 1184-1193, 2021, doi: 10.1109/OJAP.2021.3127631.

* cited by examiner

Second PCB
360

900

SIZE EXPANDABLE DUAL POLARIZED ANTENNA ARRAY

FIELD OF DISCLOSURE

The present disclosure relates to antennas, and more particularly to an expandable dual polarized antenna array.

BACKGROUND

An antenna transduces electromagnetic (EM) waves to radio frequency (RF) electrical signals. An aperture is typically considered as the portion of a surface of an antenna through which a majority of the EM waves are transmitted or received. Antennas can be arranged in arrays to provide wideband and ultra-wideband (UWB) operations, such as in conjunction with radar and tracking systems, high data rate communication links, and multi-waveform, multi-function front end systems. Some applications, particularly space-based deployments, can impose significant restrictions on antenna design including the size of an antenna array.

Figure 1:
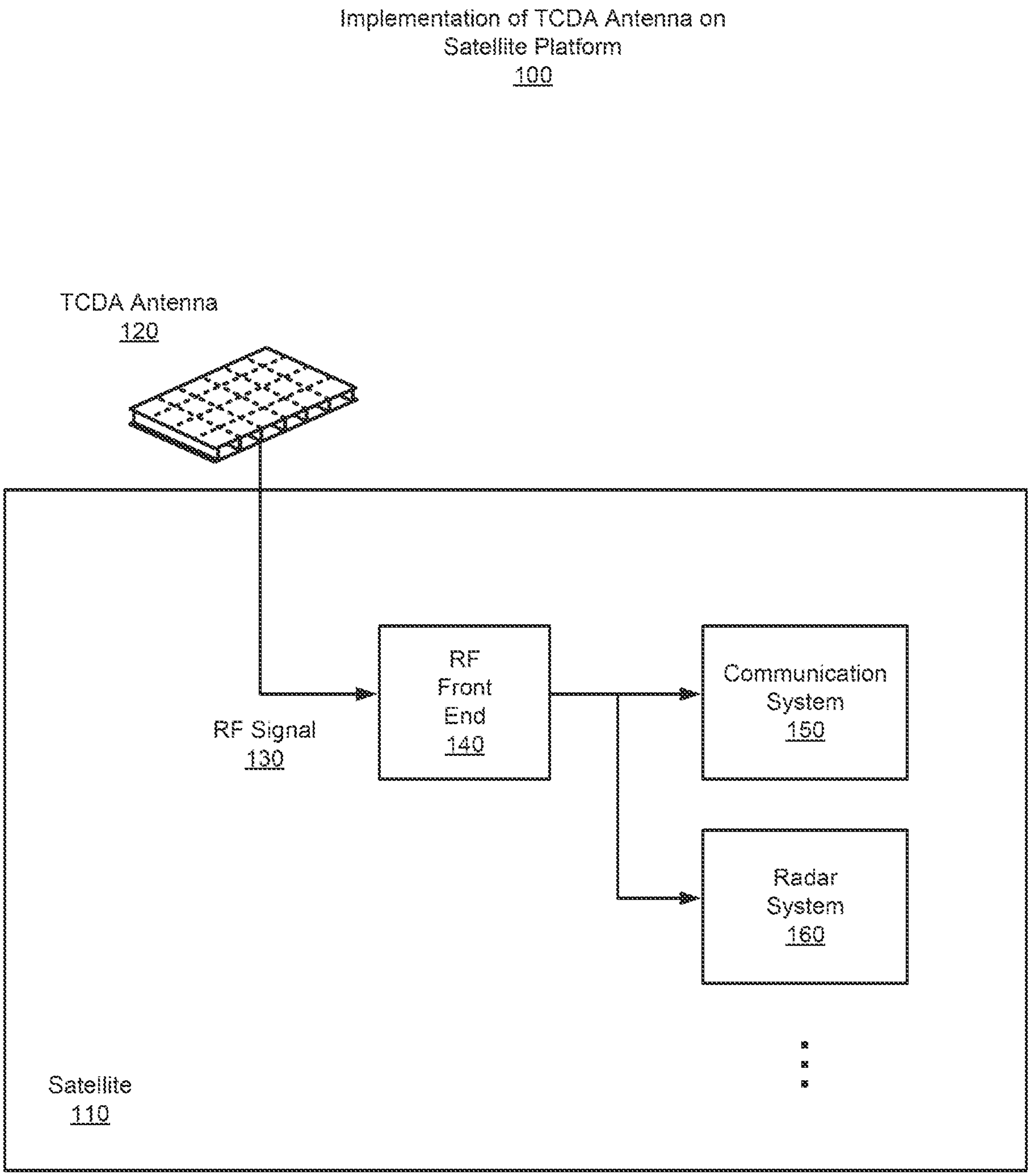
FIG. 1 illustrates an implementation of a deployable tightly coupled dipole array (TCDA) antenna on a satellite platform, in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Techniques are provided herein for an expandable antenna structure. In an example, the antenna structure is a dual-linear polarized expandable tightly coupled dipole array (TCDA) antenna. As noted above, many applications, including satellites and spacecraft, can impose significant restrictions on antenna design including antenna size and volume. For example, antennas may need to be contained in a relatively small form factor during launch and prior to deployment, but then later be expanded in size to meet operational requirement during deployment. Size restrictions are of particular concern in low frequency signal applications that are of growing interest, but which generally require larger antennas to handle the longer wavelengths of these signals. Additionally, antennas may need to provide dual-linear polarization to meet multifunction requirements.

To this end, techniques are herein disclosed for the design and fabrication of a foldable or expandable antenna that can accommodate various size restrictions. In an example, the antenna may be a TCDA antenna which provides dual-linear polarization (e.g., horizontal and vertical polarizations) and which is capable of switching between a folded configuration and an expanded or deployable configuration. The use of flexible substrates allows for folding of the antenna, as described below. The aperture of a TCDA antenna includes a cluster of antenna elements located or arrayed adjacent to each other and electrically coupled to radiate or receive signals. In an example, the antenna elements of the TCDA include a horizontally polarized planar dipole antenna and a vertically polarized dipole antenna. When the antenna is in the unfolded or deployed configuration, the horizontally polarized planar dipole antenna is oriented perpendicularly to the vertically polarized dipole antenna. In the folded or stowed configuration, the horizontally polarized planar dipole antenna and the vertically polarized dipole antenna compress into an accordion-like configuration, where the horizontally polarized planar dipole antenna is oriented at an acute angle relative to the vertically polarized dipole antenna.

The disclosed antenna is frequency scalable but may have greatest utility at lower frequency bands including the very high frequency (VHF) band and the ultra-high frequency (UHF) band, which have relatively longer wavelengths within the RF spectrum. In some embodiments, the disclosed antenna may provide UWB capability, for example achieving a frequency bandwidth ratio of 6:1 or more (e.g., a ratio of the highest frequency band to the lowest frequency band).

In accordance with an embodiment, the expandable TCDA antenna with dual-linear polarization includes an array of the electrically coupled antenna elements. Each of the antenna elements comprise a horizontally polarized planar dipole antenna disposed on a first foldable substrate and a ground plane disposed on a second foldable substrate. The second substrate is parallel to the first substrate. The antenna elements also comprise a first printed circuit board (PCB) coupling the first substrate to the second substrate, the first PCB perpendicular to the first substrate and the second substrate. The antenna elements further comprise a second PCB coupling the first substrate to the second substrate, the second PCB perpendicular to the first substrate and the second substrate and parallel to the first PCB. The antenna elements further comprise a vertically polarized dipole antenna disposed on the second PCB.

The disclosed antenna array can be hosted on, or otherwise be incorporated into the electronic systems of a satellite, a spacecraft, an aircraft, a ground vehicle, a ship, or any other suitable platform where RF signals may be received or transmitted, and limits are imposed on antenna size.

It will be appreciated that the techniques described herein may provide improved UWB performance resulting from dual-linear polarization capability along with reduced size prior to deployment afforded by foldability and expandability. Numerous embodiments and applications will be apparent in light of this disclosure.

System Architecture

FIG. 1 illustrates an implementation 100 of a deployable tightly coupled dipole array (TCDA) antenna 120 on a satellite platform 110, in accordance with certain embodiments of the present disclosure. The implementation 100 is shown to include the TCDA antenna 120, in a deployed configuration on the satellite 110, coupled to an RF front end 140. The TCDA antenna is configured to receive (or transmit) an RF signal 130 through the aperture of the antenna. The RF front end is configured to provide filtering, amplification, and/or mixing (e.g., for down conversion or up conversion) of the RF signal 130. The implementation 100 is also shown to include example applications including a communication system 150 and a radar system 160, that are configured to operate on the signal provided by the RF front end 140.

Figure 2:
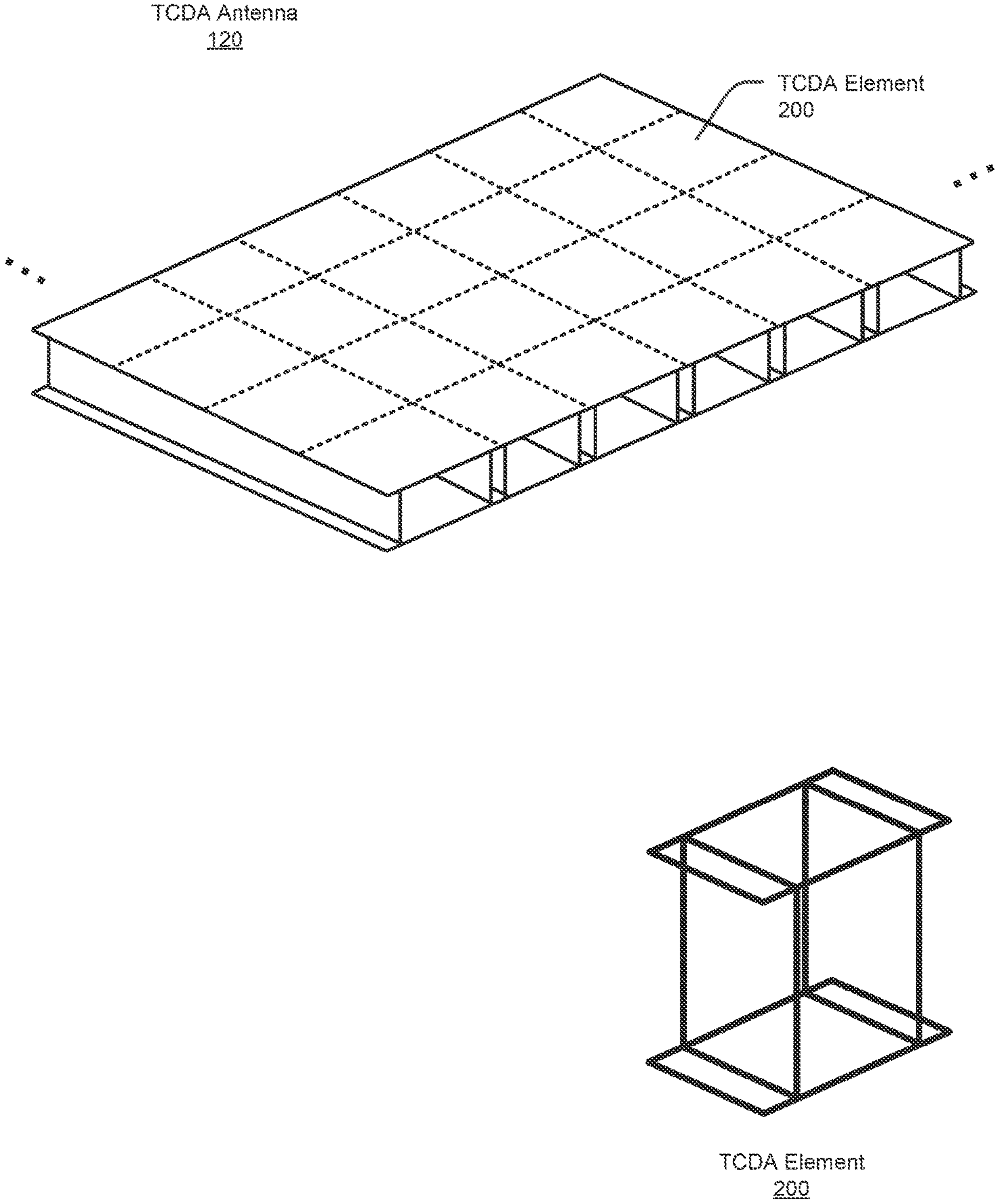
FIG. 2 illustrates a TCDA antenna comprising TCDA elements, configured in accordance with certain embodiments of the present disclosure.

FIG. 2 illustrates a TCDA antenna 120 comprising TCDA elements 200, configured in accordance with certain embodiments of the present disclosure. As shown, any number of TCDA elements 200 can be electrically coupled together and arranged in an array configuration to form the TCDA antenna 120. The TCDA elements 200 are configured to provide dual-linear polarization and to be foldable and expandable such that the TCDA antenna 120 can be collapsed for storage and transport and expanded for deployment/operation, as will be explained in greater detail below.

Figure 3:
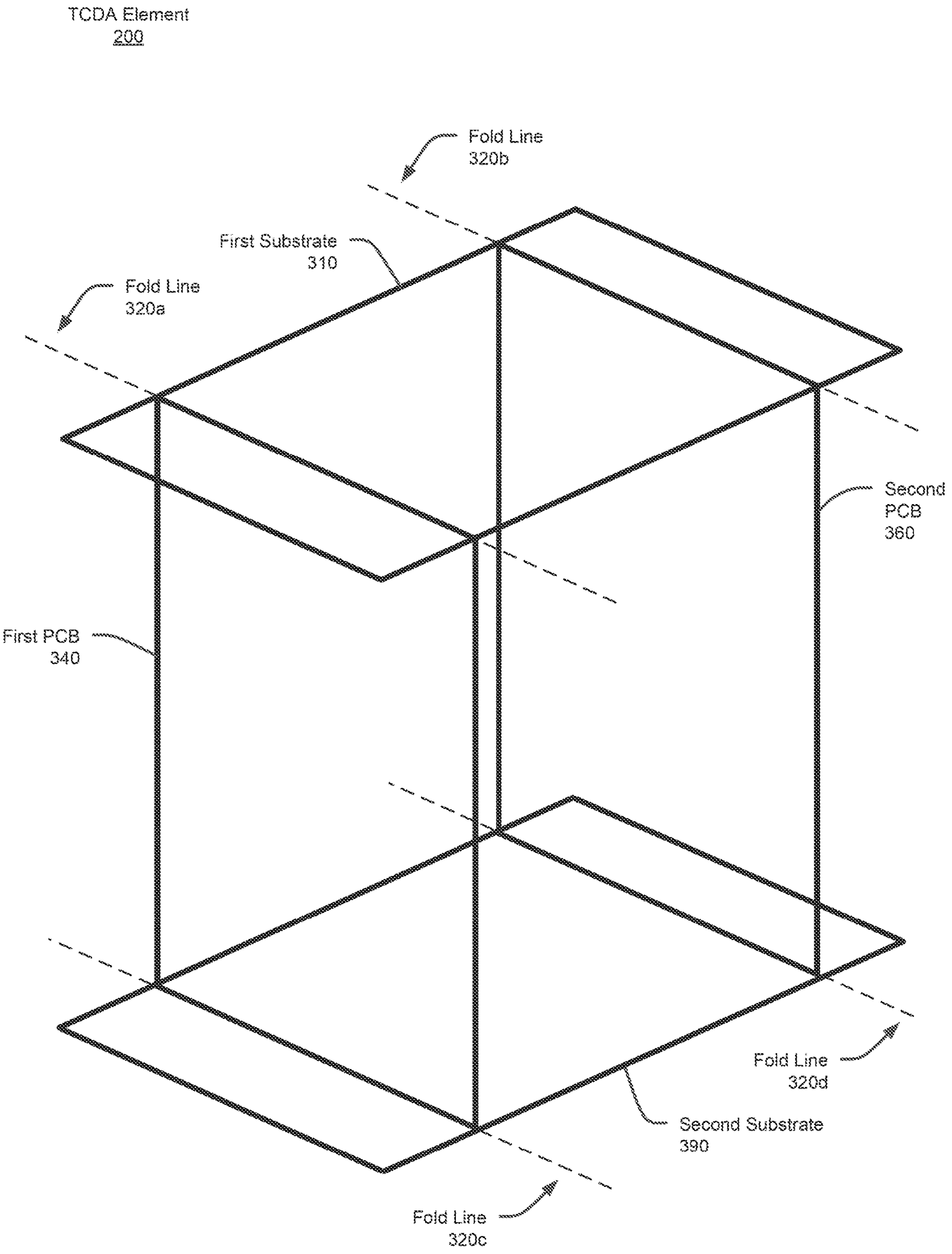
FIG. 3 provides a perspective view of a TCDA element, configured in accordance with certain embodiments of the present disclosure.

FIG. 3 provides a perspective view of a TCDA element 200 of FIG. 2, configured in accordance with certain embodiments of the present disclosure. The TCDA element 200 is shown to include a first (or upper) substrate 310, a second (or lower) substrate 390, a first PCB 340, and a second PCB 360. It should be noted that, while in some embodiments, the substrates and PCBs extend over the entire TCDA antenna 120, in this description of a TCDA element, the terms first substrate, second substrate, first PCB, and second PCB refer to the portion of that component (substrate or PCB) that is associated with the TCDA element being described.

The first substrate 310 is configured to provide an upper planar structure for the antenna element 200 upon which components (including a horizontally polarized dipole antenna 400) are disposed, as described below in connection with FIG. 4. The second substrate 390 is configured to provide a lower planar structure for the antenna element 200 upon which additional components (including a ground plane 700) are disposed, as described below in connection with FIG. 7. The first and second substrates are configured to be flexible such that they can be folded, allowing the antenna element to collapse for storage and transport when not deployed. For example, in some embodiments, the first substrate can be folded along fold lines 320*a* and 320*b*, and the second substrate can be folded along fold lines 320*c* and 320*d*. In some embodiments, the first and second substrates are flexible films, such as for example, polyimide films.

The first PCB 340 is configured to provide a rigid structural element on a first side of the antenna element 200, physically coupling the first substrate to the second substrate. Additional components (including a balun feed 500 for the horizontally polarized dipole antenna 400) are disposed on the first PCB 340, as described below in connection with FIG. 5.

The second PCB 360 is configured to provide another rigid structural element on the opposite side of the antenna element 200 from the first PCB 340, physically coupling the first substrate to the second substrate. Additional components (including a vertically polarized dipole antenna 600 and a balun feed 610 for that antenna) are disposed on the second PCB 360, as described below in connection with FIG. 6.

In some embodiments, the first and second PCBs (340, 360) are oriented parallel to each other and perpendicular to the first and second substrates (310, 390) when the antenna element is in the expanded (e.g., deployed) configuration and the substrates are in an unfolded or planar configuration.

As previously noted, in some embodiments, the first substrate 310 is configured to fold along a first folding line 320*a* and a second folding line 320*b* which may be parallel to the first folding line. Similarly, the second substrate 390 is configured to fold along a third folding line 320*c* and a fourth folding line 320*d* which may be parallel to the third folding line.

In some embodiments, the top edge of the first PCB 340 aligns with the first folding line 320*a* and the bottom edge of the first PCB 340 aligns with the third folding line 320*c*. Similarly, the top edge of the second PCB 360 may align with the second folding line 320*b* and the bottom edge of the second PCB 360 may align with the fourth folding line 320*d*.

In some embodiments, the antenna element is configured to collapse for storage and transport by folding of the first and second substrates and to expand for deployment by unfolding of the first and second substrates.

Figure 4:
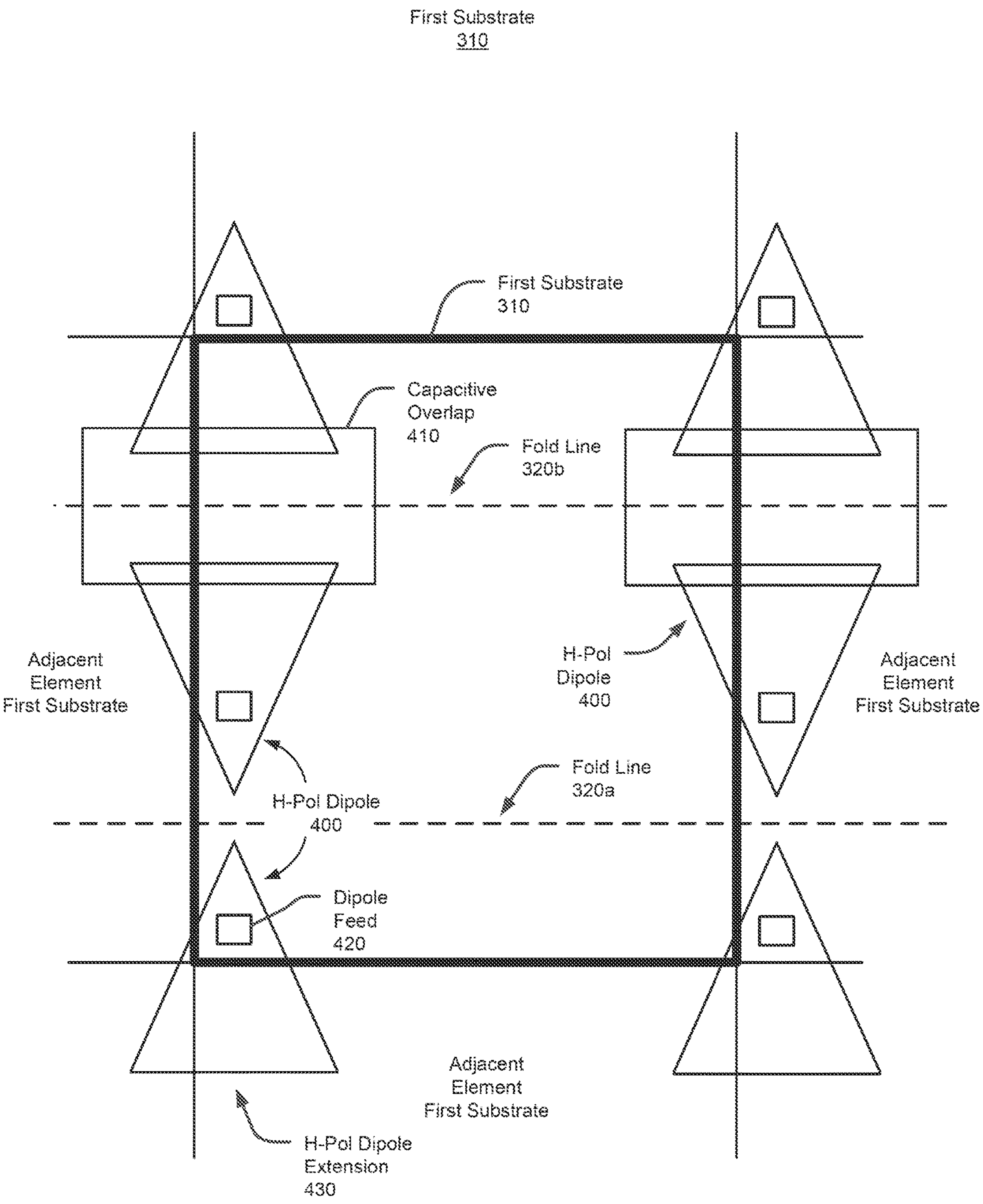
FIG. 4 provides a more detailed illustration of a first substrate of the TCDA element, configured in accordance with certain embodiments of the present disclosure.

FIG. 4 provides a more detailed illustration of the first substrate 310 of the TCDA element 200, configured in accordance with certain embodiments of the present disclosure. The first substrate 310 is shown to include portions of multiple horizontally polarized planar dipole antennas 400 which are disposed on one surface (e.g., one side) of the first substrate and extend 430 onto first substrates of adjacent elements, if adjacent elements are present. The first substrate 310 is also shown to include capacitive overlaps 410 and dipole feeds 420. The capacitive overlaps 410, provide an electrical coupling between the horizontally polarized planar dipole antennas 400 of the antenna element and the horizontally polarized planar dipole antennas of any adjacent antenna elements. The capacitive overlap 410 is disposed on the side of the first substrate that is opposite the side upon which the dipole antenna 400 is disposed, so that the capacitive overlap is not in physical contact with the dipole antenna. Dipole feeds 420 are configured to electrically couple the dipole antenna 400 to the balun feed 500 of the first PCB 340.

Figure 5:
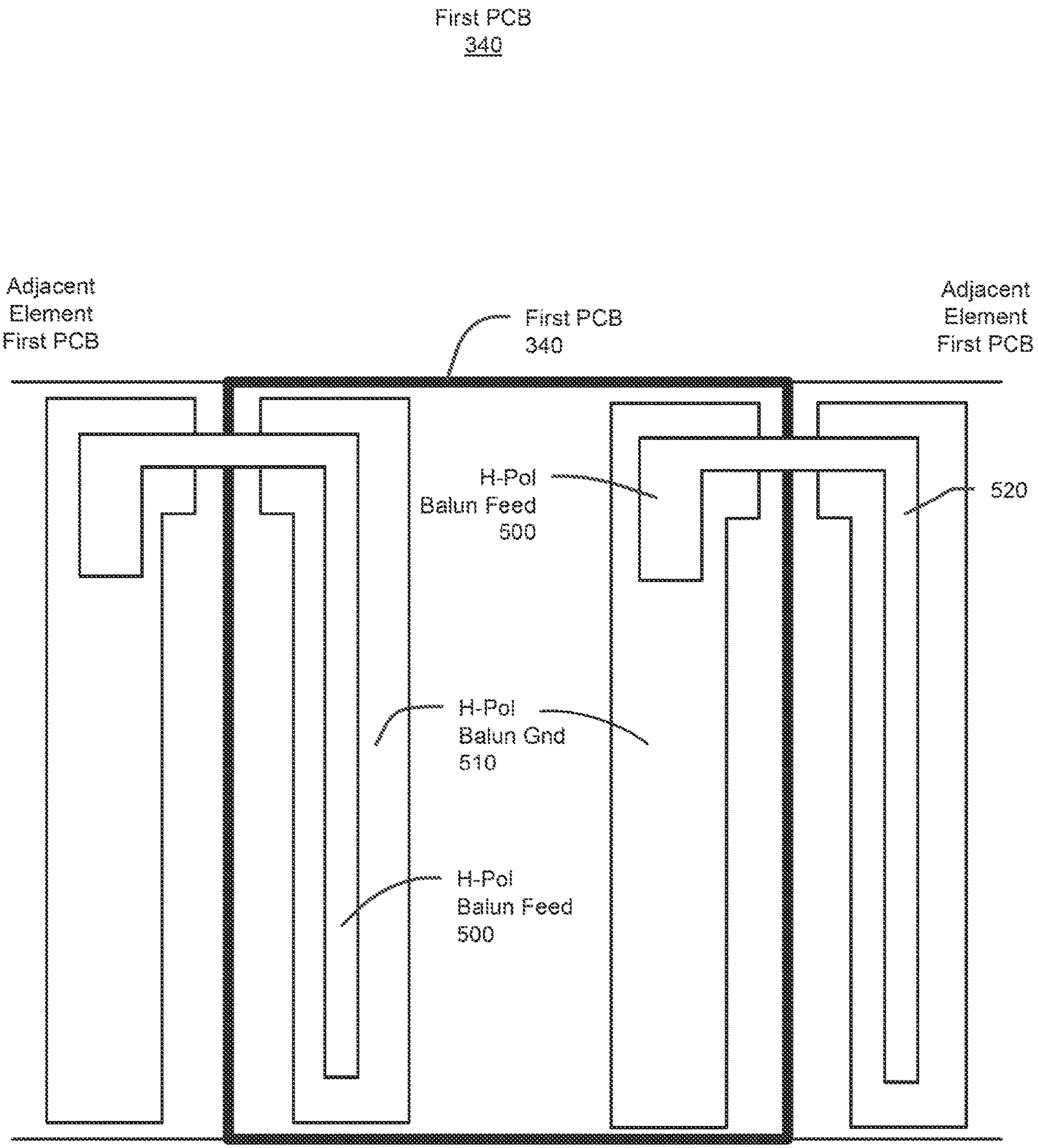
FIG. 5 provides a more detailed illustration of a first printed circuit board (PCB) of the TCDA element, configured in accordance with certain embodiments of the present disclosure.

FIG. 5 provides a more detailed illustration of the first PCB 340 of the TCDA element 200, configured in accordance with certain embodiments of the present disclosure. The first PCB 340 is shown to include a balun feed 500 and a balun ground 510. The balun feed 500 is configured to provide an electrical feed to the horizontally polarized planar dipole antenna 400 through dipole feed 420 of the first substrate 310. The balun feed 500 is disposed on one side of the PCB and the balun ground is disposed on the opposite side of the PCB. In some embodiments, the balun feed is a Marchand balun. In some other embodiments, the balun feed may be a tapered balun, a Double-Y balun, or a differential feed. The balun feed is shown to extend 520 onto the first PCB of adjacent elements, if adjacent elements are present.

Figure 6:
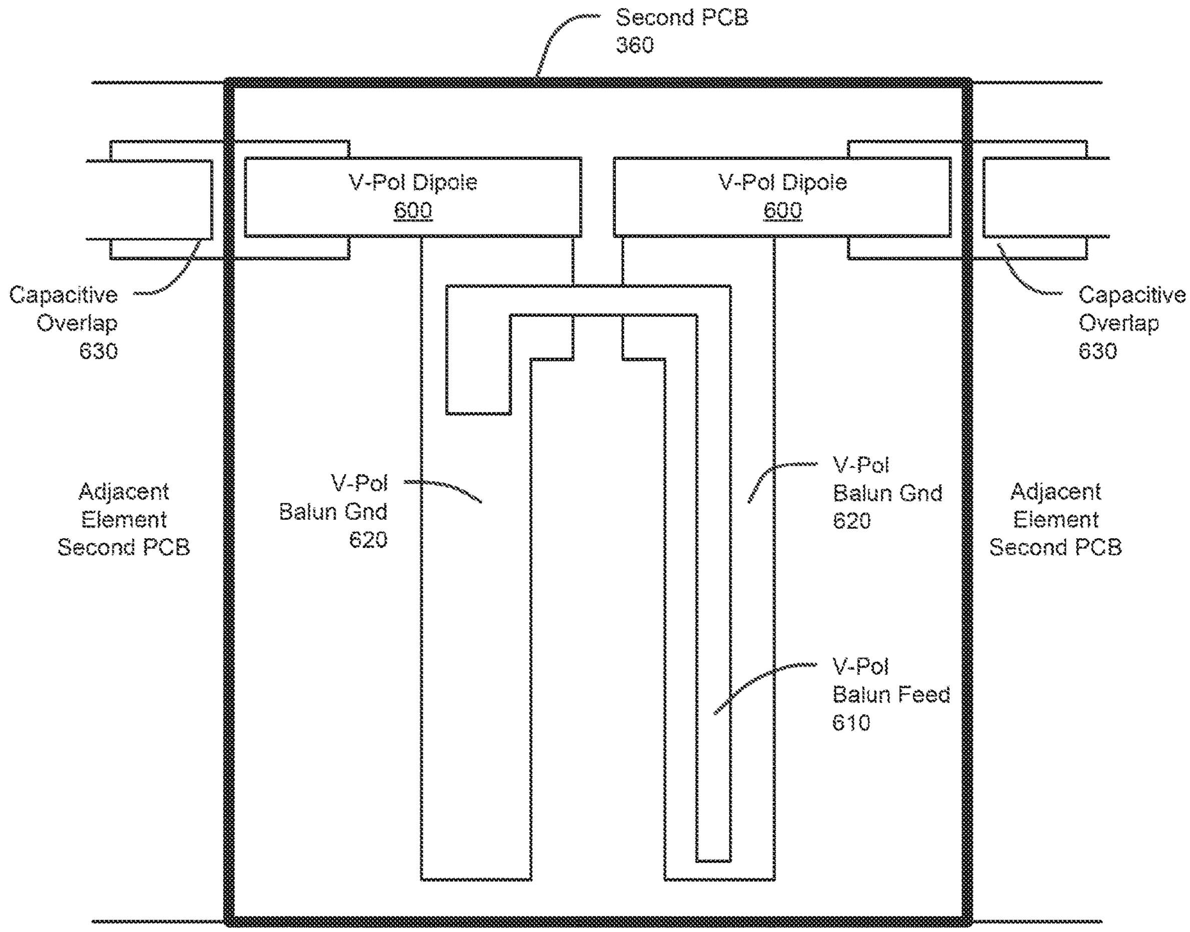
FIG. 6 provides a more detailed illustration of a second PCB of the TCDA element, configured in accordance with certain embodiments of the present disclosure.

FIG. 6 provides a more detailed illustration of the second PCB 360 of the TCDA element 200, configured in accordance with certain embodiments of the present disclosure. The second PCB 360 is shown to include the vertically polarized dipole antenna 600, the balun feed 610 for that antenna, a balun ground 620, and capacitive overlaps 630.

The balun feed 610 is configured to provide an electrical feed to the vertically polarized dipole antenna 600. The balun feed 610 is disposed on one side of the PCB and the balun ground 620 is disposed on the opposite side of the PCB. In some embodiments, the balun feed is a Marchand balun. In some other embodiments, the balun feed may be a tapered balun, a Double-Y balun, or a differential feed.

The capacitive overlaps 630, provide an electrical coupling between the vertically polarized dipole antennas 600 of the antenna element and the horizontally polarized planar dipole antennas of any adjacent antenna elements. The capacitive overlap 630 is disposed on the side of the second PCB that is opposite the side upon which the dipole antenna 600 is disposed, so that the capacitive overlap is not in physical contact with the dipole antenna.

The combination of the horizontally polarized planar dipole antenna 400 and the vertically polarized dipole antenna 600 provides a dual-linear polarization capability for the antenna element 200, and by extension, for the TCDA antenna 120.

Figure 7:
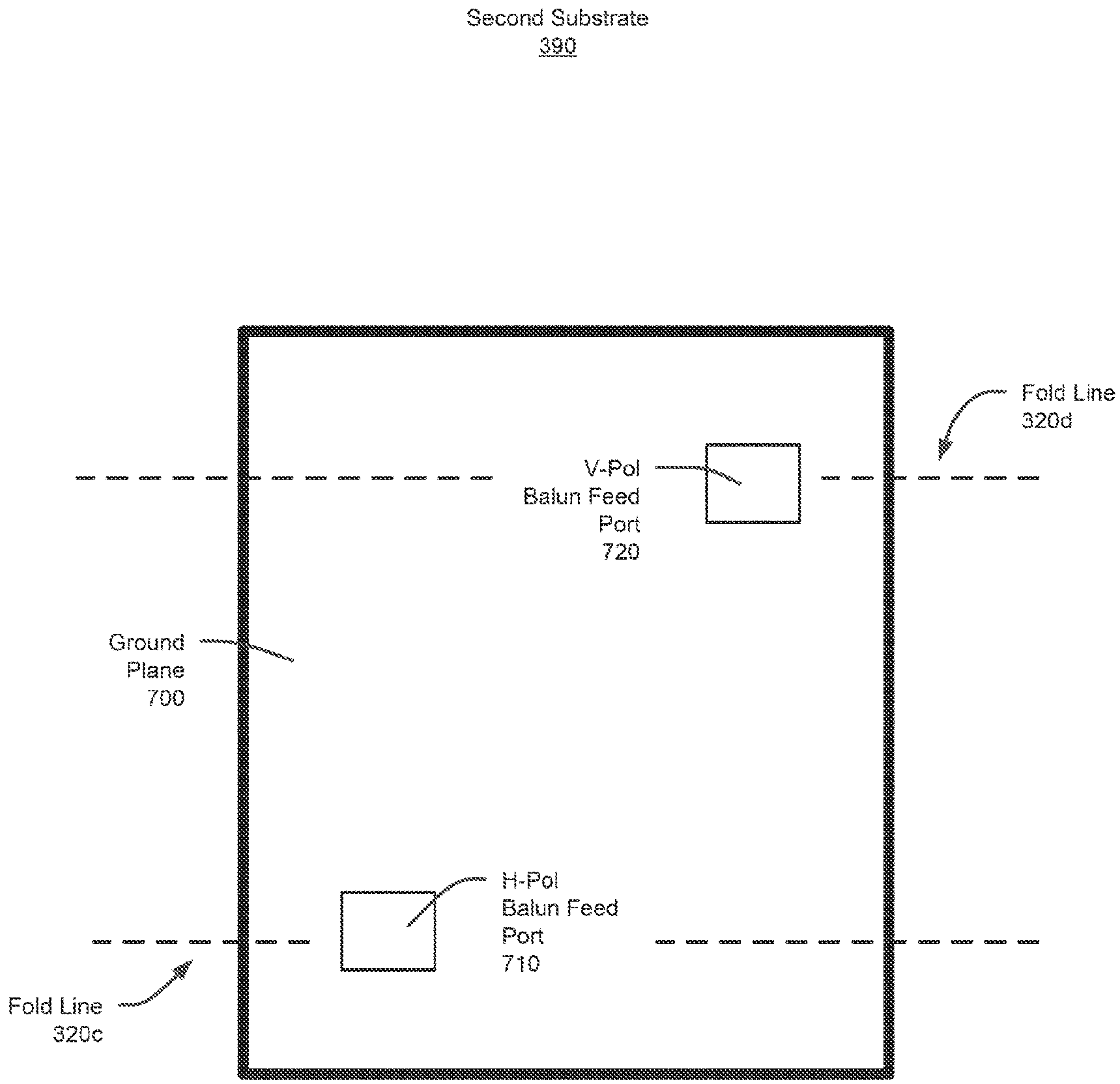
FIG. 7 provides a more detailed illustration of a second substrate of the TCDA element, configured in accordance with certain embodiments of the present disclosure.

FIG. 7 provides a more detailed illustration of the second substrate 390 of the TCDA element 200, configured in accordance with certain embodiments of the present disclosure. The second substrate 390 is shown to include the ground plane 700, a balun feed port 710, and a balun feed port 720. The ground plane extends to the second substrates of any adjacent antenna elements. The balun feed port 710 is configured to provide an electrical coupling to the balun feed 500 for the horizontally polarized planar dipole antenna 400. The balun feed port 720 is configured to provide an electrical coupling to the balun feed 610 for the vertically polarized dipole antenna 600.

In some embodiments, the dimensions of the antenna element are selected such that the antenna element is configured to operate over an ultra-wideband (UWB) frequency range having a bandwidth ratio of 6:1 or greater, for example between 75 Megahertz and 600 Megahertz.

Figure 8:
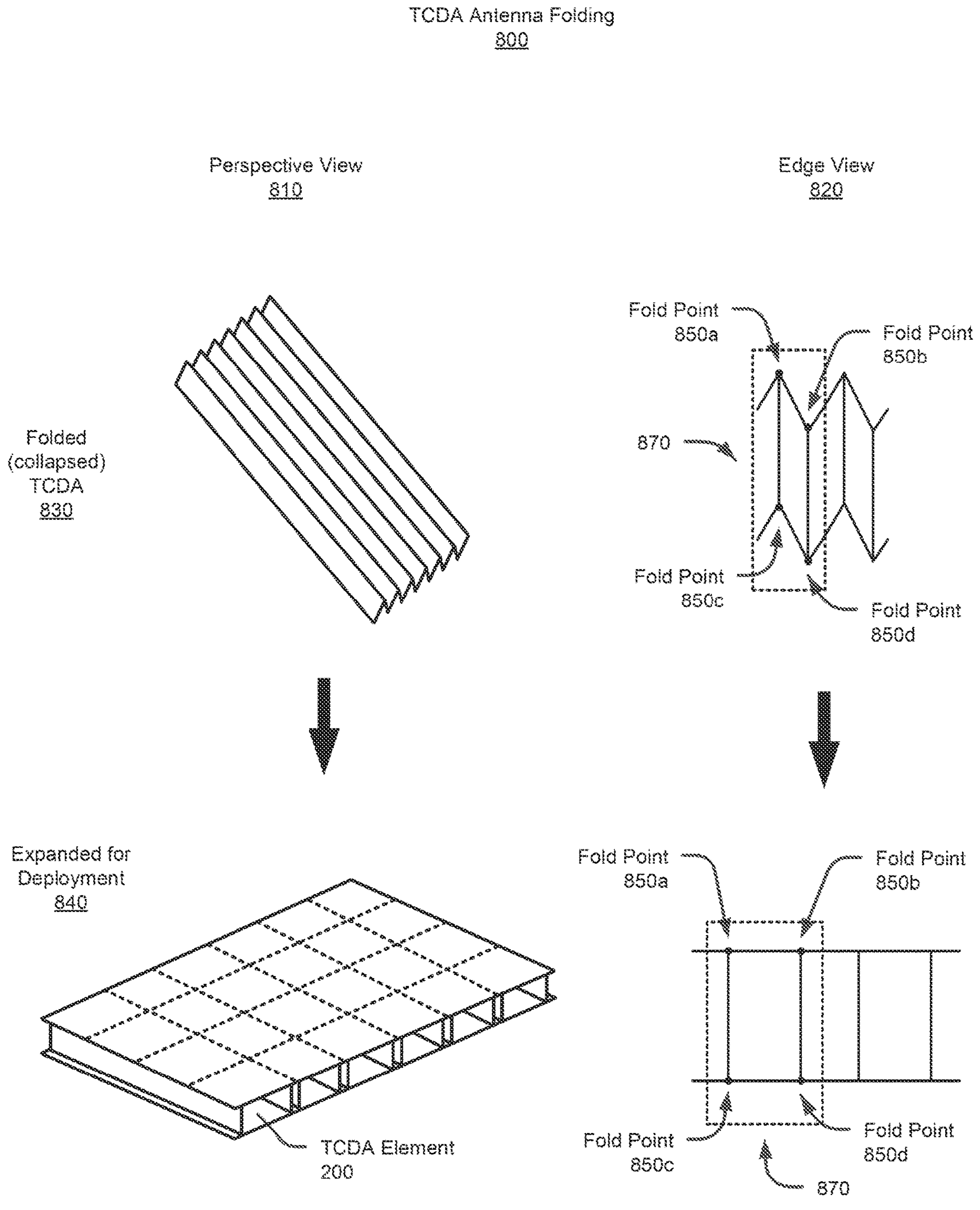
FIG. 8 illustrates TCDA antenna folding, in accordance with certain embodiments of the present disclosure.

FIG. 8 illustrates TCDA antenna folding 800, in accordance with certain embodiments of the present disclosure. As shown in the perspective view 810, the TCDA antenna may be folded into a collapsed state 830 (e.g., for storage, transport, etc.,) and then reconfigured into an expanded state 840 for deployment. As shown in the edge view 820, each antenna element 200 (within the dotted line region 870) can be folded (e.g., accordion style) and then unfolded/expanded for deployment. Fold points **850*a*, 850*b*, 850*c*, and 850*d* are the end points of the fold lines 320*a*, 320*b*, 320*c*, and 320*d***, respectively, as would be visible in an edge view of the antenna element. In some embodiments, folding of the antenna may result in size reduction (in one dimension) of 75 percent.

Methodology

Figure 9:
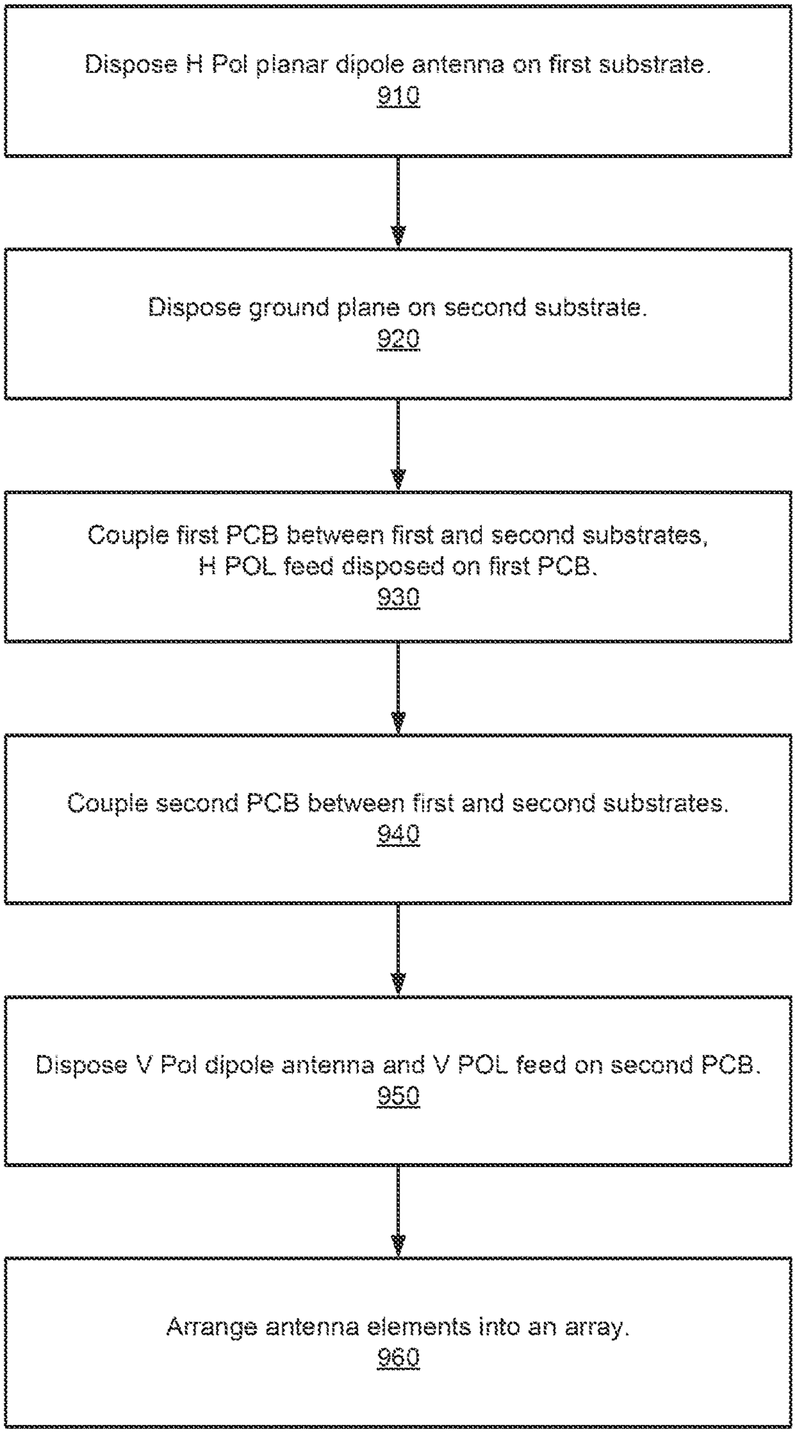
FIG. 9 is a flowchart illustrating a methodology for fabrication of a TCDA antenna, in accordance with an embodiment of the present disclosure.

FIG. 9 is a flowchart illustrating a methodology 900 for fabrication of a TCDA antenna 120, in accordance with an embodiment of the present disclosure. As can be seen, example method 900 includes a number of phases and sub-processes, the sequence of which may vary from one embodiment to another. However, when considered in aggregate, these phases and sub-processes form a fabrication process for the TCDA antenna, in accordance with certain of the embodiments disclosed herein, for example as illustrated in FIGS. 1-4, as described above. However other system architectures can be used in other embodiments, as will be apparent in light of this disclosure. To this end, the correlation of the various functions shown in FIG. 9 to the specific components illustrated in the figures, is not intended to imply any structural and/or use limitations. Rather other embodiments may include, for example, varying degrees of integration wherein multiple functionalities are effectively performed by one system. Numerous variations and alternative configurations will be apparent in light of this disclosure.

In one embodiment, method 900 commences, at operation 910, to fabricate antenna elements by disposing a horizontally polarized planar dipole antenna on a first substrate. The first substrate configured to be foldable.

Next at operation 920, a ground plane is disposed on a second substrate. The second substrate is parallel to the first substrate and configured to be foldable. In some embodiments, the first and second substrates are flexible polyimide films.

At operation 930, a first PCB, containing the feed element for the horizontal polarization, is coupled between the first substrate and the second substrate such that the first PCB is perpendicular to the first substrate and the second substrate.

At operation 940, a second PCB is coupled between the first substrate and the second substrate such that the second PCB is perpendicular to the first substrate and the second substrate and is parallel to the first PCB.

At operation 950, a vertically polarized dipole antenna and feed element is disposed on the second PCB.

At operation 960, a TCDA antenna is fabricated by arranging and electrically coupling the antenna elements into an array.

In some embodiments, additional operations may be performed, as previously described in connection with the system. For example, the first substrate may be configured to fold along a first folding line and a second folding line, the second folding line parallel to the first folding line, and the second substrate may be configured to fold along a third folding line and a fourth folding line, the fourth folding line parallel to the third folding line.

In some embodiments, a first Marchand balun is disposed on the first PCB and a second Marchand balun is disposed on the second PCB. The first Marchand balun is configured to provide an electrical feed to the horizontally polarized planar dipole antenna. The second Marchand balun is configured to provide an electrical feed to the vertically polarized dipole antenna.

In some embodiments, an alternate balun, such as double-Y or tapered balun is disposed on the first PCB and a second double-Y or tapered balun is disposed on the second PCB. The first balun is configured to provide an electrical feed to the horizontally polarized planar dipole antenna. The second balun is configured to provide an electrical feed to the vertically polarized dipole antenna.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "electrically coupled," however, may also mean that two or more elements are not in direct contact with each other, but yet still cooperate or interact with each other.

Unless specifically stated otherwise, it may be appreciated that terms such as "processing," "computing," "calculating," "estimating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, or one or more embedded routines configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads or parallel processes in a hierarchical fashion. Firmware may be embodied as code, instructions or instruction sets, and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), computers, and other processor-based or functional systems. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

FURTHER EXAMPLE EMBODIMENTS

The following examples pertain to further embodiments, from which numerous permutations and configurations will be apparent.

Example 1 is an antenna element comprising a first planar dipole antenna on a first substrate and polarized in a first direction, the first substrate configured to be foldable along a first folding line and a second folding line; a ground plane on a second substrate, the second substrate parallel to the first substrate and configured to be foldable along a third folding line and a fourth folding line; a first printed circuit board (PCB) coupling the first substrate to the second substrate; a second PCB coupling the first substrate to the second substrate; and a second dipole antenna on the second PCB and polarized in a second direction orthogonal to the first direction.

Example 2 includes the antenna element of Example 1, wherein the antenna element is configured to collapse for storage by folding of the first and second substrates along their respective folding lines, and to expand for deployment by unfolding of the first and second substrates along their respective folding lines.

Example 3 includes the antenna element of Examples 1 or 2, wherein the first substrate is configured to fold along the first folding line and the second folding line, the second folding line parallel to the first folding line when the antenna element is in a deployed configuration, and wherein the second substrate is configured to fold along the third folding line and the fourth folding line, the fourth folding line parallel to the third folding line when the antenna element is in the deployed configuration.

Example 4 includes the antenna element of any of Examples 1-3, wherein the first substrate and the second substrate are flexible polyimide films.

Example 5 includes the antenna element of any of Examples 1-4, wherein the first direction is horizontal, and the second direction is vertical, such that the first planar dipole antenna is horizontally polarized, and the second dipole antenna is vertically polarized.

Example 6 includes the antenna element of Example 5, further comprising: a first balun feed disposed on the first PCB, the first balun feed configured to provide an electrical feed to the horizontally polarized dipole antenna on the first substrate; and a second balun feed disposed on the second PCB, the second balun feed configured to provide an electrical feed to the vertically polarized dipole antenna on the second PCB.

Example 7 includes the antenna element of Example 6, wherein the first balun feed and/or the second balun feed are one or more of a Marchand balun, a tapered balun, a Double-Y balun, and a differential feed.

Example 8 includes the antenna element of any of Examples 1-7, wherein the first planar dipole antenna and the second dipole antenna are further configured to electrically couple to an adjacent antenna element such that the antenna element and the adjacent antenna element form a tightly coupled dipole array (TCDA) antenna.

Example 9 includes the antenna element of any of Examples 1-8, wherein the antenna element is foldable and expandable between a stowed position and a deployed position, and wherein in the deployed position: the second substrate is parallel to the first substrate; the first PCB is perpendicular to the first substrate and the second substrate; and the second PCB is perpendicular to the first substrate and the second substrate, and parallel to the first PCB.

Example 10 includes the antenna element of any of Examples 1-9, wherein dimensions of the antenna element are selected such that the antenna element is configured to operate over a frequency bandwidth ratio of six to one or more.

Example 11 is a tightly coupled dipole array (TCDA) antenna comprising: an array of the antenna elements, each of the antenna elements including: a first planar dipole antenna on a first substrate and polarized in a first direction, the first substrate configured to be foldable along a first folding line and a second folding line; a ground plane on a second substrate, the second substrate parallel to the first substrate and configured to be foldable along a third folding line and a fourth folding line; a first printed circuit board (PCB) coupling the first substrate to the second substrate; a second PCB coupling the first substrate to the second substrate; and a second dipole antenna on the second PCB and polarized in a second direction orthogonal to the first direction.

Example 12 includes the TCDA antenna of Example 11, wherein the TCDA antenna is configured to collapse for storage by folding of the first and second substrates of the antenna elements along their respective folding lines, and to expand for deployment by unfolding of the first and second substrates of the antenna elements along their respective folding lines.

Example 13 includes the TCDA antenna of Examples 11 or 12, wherein the first substrate and the second substrate of the antenna elements are flexible polyimide films.

Example 14 includes the TCDA antenna of any of Examples 11-13, wherein the antenna elements further comprise: a first Marchand balun disposed on the first PCB, the first Marchand balun configured to provide an electrical feed to the first planar dipole antenna; and a second Marchand balun disposed on the second PCB, the second Marchand balun configured to provide an electrical feed to the second dipole antenna.

Example 15 includes the TCDA antenna of Example 14, wherein the first planar dipole antenna and the second dipole antenna are further configured to electrically couple to an adjacent antenna element of the array of antenna elements.

Example 16 includes the TCDA antenna of any of Examples 11-15, wherein dimensions of the antenna element are selected such that the antenna element is configured to operate over a frequency bandwidth ratio of six to one or more.

Example 17 is an antenna assembly method comprising: manufacturing a plurality of antenna elements by: disposing a horizontally polarized planar dipole antenna on a first substrate, the first substrate configured to be foldable, disposing a ground plane on a second substrate, the second substrate parallel to the first substrate and configured to be foldable, coupling a first printed circuit board (PCB) between the first substrate and the second substrate such that the first PCB is perpendicular to the first substrate and the second substrate, coupling a second PCB between the first substrate and the second substrate such that the second PCB is perpendicular to the first substrate and the second substrate and is parallel to the first PCB, and disposing a vertically polarized dipole antenna on the second PCB; and fabricating a tightly coupled dipole array (TCDA) antenna by arranging and electrically coupling the plurality of antenna elements in an array.

Example 18 includes the method of Example 17, wherein the first substrate and the second substrate are flexible polyimide films, the first substrate is configured to fold along a first folding line and a second folding line, the second folding line parallel to the first folding line, and the second substrate is configured to fold along a third folding line and a fourth folding line, the fourth folding line parallel to the third folding line.

Example 19 includes the method of Examples 17 or 18, further comprising: disposing a first Marchand balun on the first PCB, the first Marchand balun configured to provide an electrical feed to the horizontally polarized planar dipole antenna; and disposing a second Marchand balun on the second PCB, the second Marchand balun configured to provide an electrical feed to the vertically polarized dipole antenna, wherein the first planar dipole antenna and the second dipole antenna are further configured to electrically couple to an adjacent antenna element of the array.

Example 20 includes the method of any of Examples 17-19, wherein the TCDA antenna is configured to collapse for storage by folding of the first and second substrates of the antenna elements and to expand for deployment by unfolding of the first and second substrates of the antenna elements.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. An antenna element comprising:

a first planar dipole antenna on a first substrate and polarized in a first direction, the first substrate configured to fold along a first folding line and a second folding line;

a ground plane on a second substrate, the second substrate parallel to the first substrate and configured to fold along a third folding line and a fourth folding line;

a first printed circuit board (PCB) coupling the first substrate to the second substrate;

a second PCB coupling the first substrate to the second substrate; and a second dipole antenna on the second PCB and polarized in a second direction orthogonal to the first direction.

2. The antenna element of claim 1, wherein the antenna element is configured to collapse for storage by folding of the first and second substrates along their respective folding lines, and to expand for deployment by unfolding of the first and second substrates along their respective folding lines.

3. The antenna element of claim 1, wherein the first substrate is configured to fold along the first folding line and the second folding line, the second folding line parallel to the first folding line when the antenna element is in a deployed configuration, and wherein the second substrate is configured to fold along the third folding line and the fourth folding line, the fourth folding line parallel to the third folding line when the antenna element is in the deployed configuration.

4. The antenna element of claim 1, wherein the first substrate and the second substrate are flexible polyimide films.

5. The antenna element of claim 1, wherein the first direction is horizontal, and the second direction is vertical, such that the first planar dipole antenna is horizontally polarized, and the second dipole antenna is vertically polarized.

6. The antenna element of claim 5, further comprising:

a first balun feed disposed on the first PCB, the first balun feed configured to provide an electrical feed to the horizontally polarized dipole antenna on the first substrate; and a second balun feed disposed on the second PCB, the second balun feed configured to provide an electrical feed to the vertically polarized dipole antenna on the second PCB.

7. The antenna element of claim 6, wherein the first balun feed and/or the second balun feed are one or more of a Marchand balun, a tapered balun, a Double-Y balun, and a differential feed.

8. The antenna element of claim 1, wherein the first planar dipole antenna and the second dipole antenna are further configured to electrically couple to an adjacent antenna element such that the antenna element and the adjacent antenna element form a tightly coupled dipole array (TCDA) antenna.

9. The antenna element of claim 1, wherein the antenna element is foldable and expandable between a stowed position and a deployed position, and wherein in the deployed position:

the second substrate is parallel to the first substrate;

the first PCB is perpendicular to the first substrate and the second substrate; and the second PCB is perpendicular to the first substrate and the second substrate, and parallel to the first PCB.

10. The antenna element of claim 1, wherein dimensions of the antenna element are selected such that the antenna element is configured to operate over a frequency bandwidth ratio of six to one or more.

11. A tightly coupled dipole array (TCDA) antenna comprising:

an array of the antenna elements, each of the elements of the array antenna elements including:

a first planar dipole antenna on a first substrate and polarized in a first direction, the first substrate configured to fold along a first folding line and a second folding line;

a ground plane on a second substrate, the second substrate parallel to the first substrate and configured to fold along a third folding line and a fourth folding line;

a first printed circuit board (PCB) coupling the first substrate to the second substrate;

a second PCB coupling the first substrate to the second substrate; and a second dipole antenna on the second PCB and polarized in a second direction orthogonal to the first direction.

12. The TCDA antenna of claim 11, wherein the TCDA antenna is configured to collapse for storage by folding of the first and second substrates of the antenna elements along their respective folding lines, and to expand for deployment by unfolding of the first and second substrates of the antenna elements along their respective folding lines.

13. The TCDA antenna of claim 11, wherein the first substrate and the second substrate of the antenna elements are flexible polyimide films.

14. The TCDA antenna of claim 11, wherein the antenna elements further comprise:

a first Marchand balun disposed on the first PCB, the first Marchand balun configured to provide an electrical feed to the first planar dipole antenna; and a second Marchand balun disposed on the second PCB, the second Marchand balun configured to provide an electrical feed to the second dipole antenna.

15. The TCDA antenna of claim 14, wherein the first planar dipole antenna and the second dipole antenna are further configured to electrically couple to an adjacent antenna element of the array of antenna elements.

16. The TCDA antenna of claim 11, wherein dimensions of the antenna element are selected such that the antenna element is configured to operate over a frequency bandwidth ratio of six to one or more.

17. An antenna assembly method comprising:

manufacturing a plurality of antenna elements by:

disposing a horizontally polarized planar dipole antenna on a first substrate, the first substrate configured to fold, disposing a ground plane on a second substrate, the second substrate parallel to the first substrate and configured to fold, coupling a first printed circuit board (PCB) between the first substrate and the second substrate such that the first PCB is perpendicular to the first substrate and the second substrate, coupling a second PCB between the first substrate and the second substrate such that the second PCB is perpendicular to the first substrate and the second substrate and is parallel to the first PCB, and disposing a vertically polarized dipole antenna on the second PCB; and fabricating a tightly coupled dipole array (TCDA) antenna by arranging and electrically coupling the plurality of antenna elements in an array.

18. The method of claim 17, wherein the first substrate and the second substrate are flexible polyimide films, the first substrate is configured to fold along a first folding line and a second folding line, the second folding line parallel to the first folding line, and the second substrate is configured to fold along a third folding line and a fourth folding line, the fourth folding line parallel to the third folding line.

19. The method of claim 17, further comprising:

disposing a first Marchand balun on the first PCB, the first Marchand balun configured to provide an electrical feed to the horizontally polarized planar dipole antenna; and disposing a second Marchand balun on the second PCB, the second Marchand balun configured to provide an electrical feed to the vertically polarized dipole antenna, wherein the first planar dipole antenna and the second dipole antenna are further configured to electrically couple to an adjacent antenna element of the array.

20. The method of claim 17, wherein the TCDA antenna is configured to collapse for storage by folding of the first and second substrates of the antenna elements and to expand for deployment by unfolding of the first and second substrates of the antenna elements.

* * * * *